United States Patent
Hartikka et al.

(10) Patent No.: US 8,622,571 B2
(45) Date of Patent: Jan. 7, 2014

(54) LED TUBE AND A LIGHTING FIXTURE ARRANGEMENT HAVING A SAFETY UNIT

(75) Inventors: Yrjö Hartikka, Pennala (FI); Jouko Kuisma, Lahti (FI)

(73) Assignee: Teknoware Oy, Lahti (FI)

( * ) Notice: Subject to any disclaimer, the term of this patent is extended or adjusted under 35 U.S.C. 154(b) by 235 days.

(21) Appl. No.: 13/051,411

(22) Filed: Mar. 18, 2011

(65) Prior Publication Data

US 2011/0228526 A1  Sep. 22, 2011

(30) Foreign Application Priority Data

Mar. 19, 2010  (FI) ..................................... 20105279

(51) Int. Cl.
*F21V 25/04* (2006.01)

(52) U.S. Cl.
USPC ....................... 362/221; 362/249.03; 362/555

(58) Field of Classification Search
USPC ..................... 362/221, 294, 551, 249.03, 555
See application file for complete search history.

(56) References Cited

U.S. PATENT DOCUMENTS

| | | | |
|---|---|---|---|
| 7,611,260 B1 | 11/2009 | Lin et al. | |
| 8,147,091 B2 * | 4/2012 | Hsia et al. | ..................... 362/221 |
| 2007/0133202 A1 | 6/2007 | Huang et al. | |
| 2007/0183156 A1 | 8/2007 | Shan | |
| 2007/0223225 A1 * | 9/2007 | Eiich et al. | ..................... 362/260 |
| 2009/0290334 A1 | 11/2009 | Ivey et al. | |
| 2010/0002439 A1 | 1/2010 | Lin et al. | |
| 2011/0260614 A1 * | 10/2011 | Hartikka et al. | ................. 315/51 |
| 2011/0260622 A1 * | 10/2011 | Hartikka et al. | .............. 315/113 |
| 2012/0299494 A1 * | 11/2012 | Hartikka | ....................... 315/201 |

FOREIGN PATENT DOCUMENTS

| | | |
|---|---|---|
| AU | 101044 A4 | 11/2009 |
| EP | 1 852 648 A1 | 11/2007 |
| GB | 2465966 A | 6/2010 |
| WO | WO 2009067074 A1 * | 5/2009 |
| WO | WO 2009/131340 A2 | 10/2009 |
| WO | WO 2010/069983 A1 | 6/2010 |

* cited by examiner

*Primary Examiner* — Tracie Y Green
(74) *Attorney, Agent, or Firm* — Leydig, Voit & Mayer, Ltd.

(57) ABSTRACT

A LED tube (41) comprises one or more LED components (34) and a current control unit (33) installed therein. Both ends of the LED tube (41) are provided with a contact pin pair (37, 38, 39, 40) for connecting the LED tube mechanically and electrically to tube holders of a fluorescent tube lighting fixture. The LED tube includes a safety unit (42, 43, S1) arranged to prevent a voltage from passing through the LED tube (41) from its one end to the other end thereof until at both ends of the LED tube, a voltage (U1, U2) fed from the corresponding tube holder of the lighting fixture to the contact pin pair (37, 38, 39, 40) has been detected separately.

14 Claims, 4 Drawing Sheets

Fig. 5A $$U_1 = \frac{R_1}{R_1 + R_2 + R_3} \cdot U_{in}$$

$$U_2 = \frac{R_2}{R_1 + R_2 + R_3} \cdot U_{in}$$

LED TUBE AND A LIGHTING FIXTURE ARRANGEMENT HAVING A SAFETY UNIT

BACKGROUND OF THE INVENTION

The invention relates to lamps, and particularly to LED tubes having one or more LEDs as a light source and enabling a fluorescence tube to be replaced.

Figure 1A:
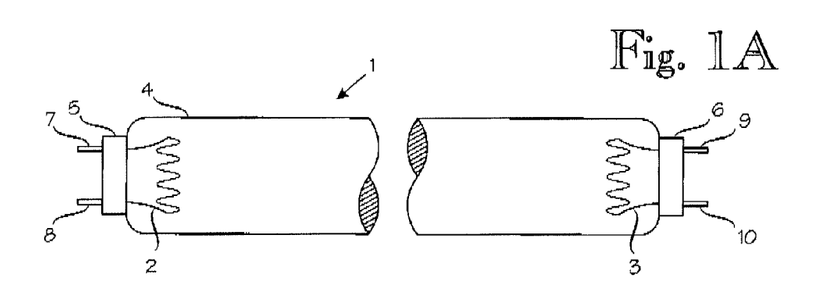
FIG. 1A shows a simplified example of a mechanical structure of a fluorescent tube.
Figure 1B:
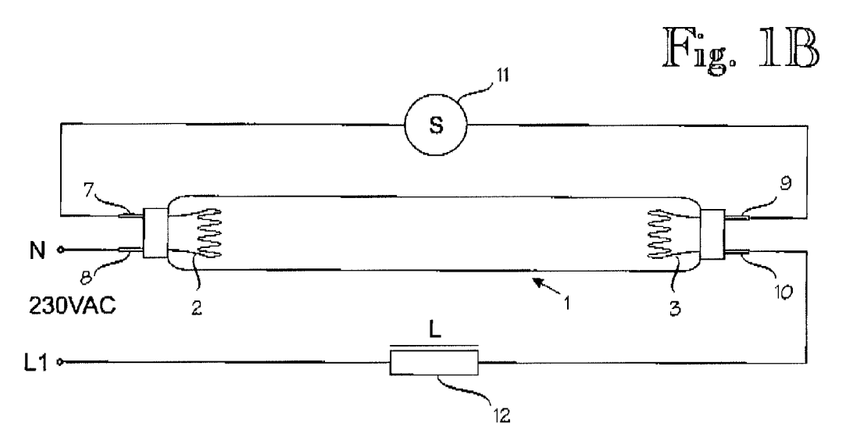
FIG. 1B shows an example of an electrical circuitry of a fluorescent tube when a ballast is implemented by a ballast-starter combination.

Fluorescent lamps are widely used in various environments, such as homes, offices, industry. Fluorescent lamps have longer life, they are more economic and more efficient than incandescent lamps wherein most of the electric power generates heat rather than light. In a conventional fluorescent lamp, the body consists of a straight tube whose length is 15 to 60 times that of the diameter of the tube. The tube may also be bent, in which case the tube may have almost any shape. Fluorescent tubes are low-pressure mercury discharge lamps wherein the inner surface of the tube is coated with a fluorescent material. The structure of a fluorescent tube is very simple; this is illustrated in FIG. 1A. The lamp consists of an airtight glass tube 4 containing a small amount of mercury, an inert gas, a fluorescent coating (luminophore), such as phosphorus, as well as electrodes 2 and 3 (filaments). Both ends of the fluorescent tube are provided with a cap 5 or 6 having two symmetrically placed contact pins 7 and 8 or 9 and 10 to which the electrode 2 or 3 is connected. The current supply to the fluorescent tube is provided via these contact pins 7 and 8, 9 and 10. When the lamp is in operation, the temperature of the electrodes 2 and 3 has to be sufficiently high in order to enable electrons to be released therefrom. At a normal operating voltage, the fluorescent lamp does not ignite without preheating. It is typical of fluorescent tubes (EN 60081) that their cathodes are heated by separate preheat circuits or arrangements. On the other hand, after ignition, a discharging current passing through the tube has to be limited in order for the tube not to become destroyed. Therefore, all fluorescent tubes need a ballast. Conventionally, the ballast has been a ballast-starter combination, which is illustrated in FIG. 1B. When a mains voltage (e.g. 230 VAC) is connected to the lamp, the resistance through the tube is very high, and electric current passes via a ballast L, the electrode 3, a closed starter 11, and the electrode 2. When the electric current passes through the electrodes 2 and 3, it heats the electrodes, causing them to emit electrons which ionize the gas inside the tube. The ionized gas forms a current path through the tube. The current passing through the ballast L generates a magnetic field therein. When, after a while, the starter 11 opens, the magnetic field of the ballast L generates a high voltage between the electrodes 2 and 3, which ignites the lamp.

Figure 1C:
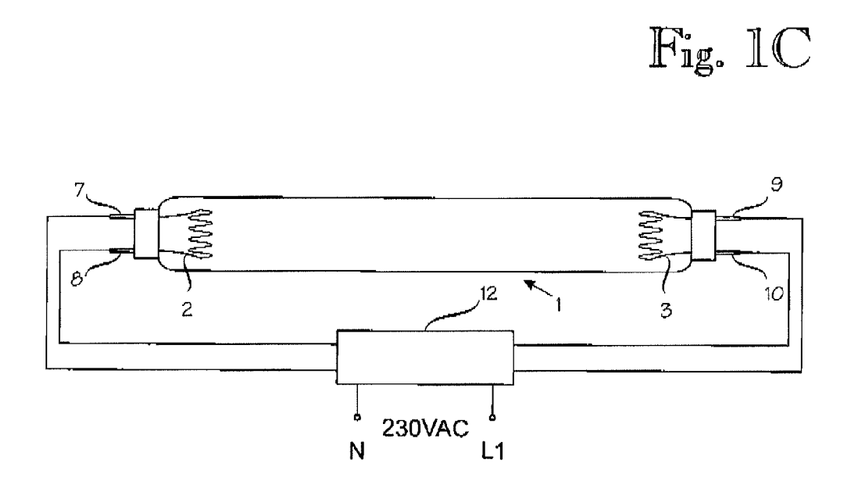
FIG. 1C shows an example of an electrical circuitry of a fluorescent tube when an electronic ballast is used.

Today, also electronic ballasts are used. An electronic ballast is also responsible for igniting the lamp, so no separate starter is necessary. The preheating arrangement is implemented either by separate preheating windings or a starter capacitor. This is illustrated in FIG. 1C. An electronic ballast 12 connected to the mains voltage (e.g. 230 VAC) provides a continuous electric current through each electrode 2 and 3. These electric currents are configured so that a voltage difference is formed between the electrodes 2 and 3. When the mains voltage is connected to the ballast 12, the electric current passing through the electrodes heats them quickly, and the emitted electrons ionize the gas contained in the tube. After the gas has become ionized, the voltage difference between the electrodes starts a gas discharge.

A common aim is to replace fluorescent tubes by LED tubes having the same length and values. Their physical dimensions are the same as those of straight fluorescent tubes (e.g. T8 having a 26 mm diameter and being e.g. 60 or 120 cm in length), enabling a LED tube to directly replace a fluorescent tube in an existing fluorescent lamp. Examples of such LED tube lamps are set forth in EP1852648, US2007/0183156, US2010/0002439, and WO2009/131340. The goal is to achieve a long life for the light source and a better luminous efficiency (quantity of light/electric power). In practice, the aim is only to replace a fluorescent tube by a LED tube without changing the structures of the lamp. Some LED tubes work directly with a fluorescent tube ballast, in which case only the starter is to be removed from use. In such a case, the LED tube replacement may take place easily and without any professional assistance.

Figure 2:
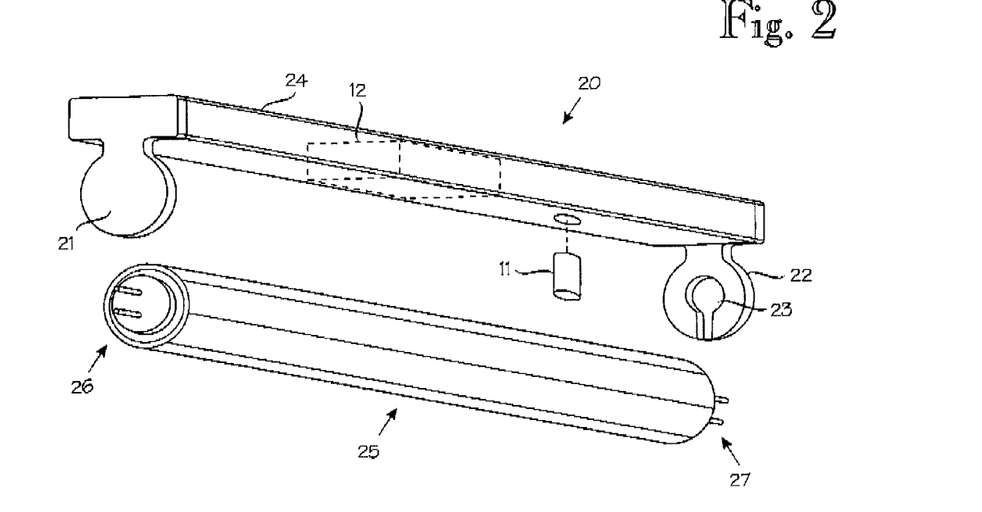
FIG. 2 shows a simplified example of a structure of a fluorescent tube lighting fixture.

This causes some problems, the most important one being the danger of an electric shock while installing the LED tube. FIG. 2 illustrates in a simplified manner a fluorescent tube lighting fixture 20 comprising a body 24 containing the necessary electronic structures, such as a ballast 12 and a starter 11, which is usually necessary only in connection with a ballast. The ends of the lighting fixture are provided with tube holders 21 and 22 provided with contact sockets 23 into which contact pins of the ends 26 and 27 of the tube 25 are inserted in order to achieve a mechanical and electrical connection. According to safety regulations in the field, lighting fixtures are to be built such that it is impossible for a user to come into contact with any parts at the mains voltage while replacing a fluorescent tube even if the lamp were connected to the mains voltage. This requirement is met even if the fluorescent tube were replaced such that only one end 27 of the tube 25 is in contact with the contacts 23 of the tube holder 22 while the other end 26 of the tube may freely come into contact with a person carrying out the replacement. This requirement is met since no current flows through the gas-filled fluorescent tube until the gas in the tube is ionized by a starting pulse. Thus, the gas per se in the fluorescent tube serves as an insulating material. The electrical structure of the lighting fixture, again, is such that the generation of a starting pulse requires that both ends of the tube be connected to the contacts of the tube holder. This enables the risk of an electric shock in connection with a fluorescent tube to be prevented while replacing the tube.

In connection with LED tubes, this electrical safety condition is not met. Inside the LED tubes there is provided a printed circuit board or a corresponding structure where the LEDs and their necessary electronic current supply components are installed. The purpose of these components is to convert the supply network alternating voltage into direct voltage and regulate the direct current required by the LEDs. In practice, current flows through these components as soon as voltage is applied thereto, in other words the LED tube is in a conductive state without any separate starting pulse. Therefore, in a use situation, when the LED tube 25 is being installed in the fluorescent tube lighting fixture 20, the contact pins 27 of one end of the LED tube 25 may come into contact with the contacts 23 of the tube holder 22 and the other end 26 of the tube be left outside the lighting fixture such that the person installing or replacing the tube may come into contact therewith, putting him or her at the risk of an electric shock.

BRIEF DESCRIPTION OF THE INVENTION

An object of the invention is thus to provide a LED tube and a lighting fixture arrangement so as to enable the aforementioned electrical safety problem to be solved. The object of the invention is achieved by a LED tube and an arrangement which are characterized by what is stated in the independent claims. Preferred embodiments of the invention are disclosed in the dependent claims.

An aspect of the invention is a LED tube comprising a substantially fluorescent-tube-shaped and fluorescent-tube-sized translucent or fluorescent tube having one or more LED components and a current control unit installed therein, both ends of the LED tube being provided with at least one contact pin for connecting the LED tube mechanically and electrically to tube holders of a fluorescent tube lighting fixture. The LED tube includes a safety unit arranged to prevent a voltage from passing through the LED tube from its one end to the other end thereof until at both ends of the LED tube, a voltage fed from the corresponding tube holder of the lighting fixture to said at least one contact pin is detected separately.

According to an embodiment, the safety unit comprises switching means on a current path between the contact pins provided at different ends of the LED tube, the switching means being arranged to be open and break the current path when no voltage has been detected from said at least one contact pin of one or either of the ends of the LED tube, and arranged to be closed and connect the current path only when a voltage has been detected from said at least one contact pin of both ends of the LED tube.

According to an embodiment, the safety unit comprises switching means in series on a current path at least between said at least one contact pin of one end of the LED tube and the current control unit, the switching means being arranged to be open and break the current path when no voltage has been detected from said at least one contact pin of one or either of the ends of the LED tube, and arranged to be closed and connect the current path only when a voltage has been detected from said at least one contact pin of both ends of the LED tube.

According to an embodiment, the LED tube comprises two contact pins at both ends of the LED tube, the safety unit being arranged to detect a voltage between these two contact pins at both ends of the LED tube.

According to an embodiment, the safety unit is arranged to detect a preheating voltage received from a socket of a fluorescent tube lighting fixture at the contact pins at both ends of the LED tube.

According to an embodiment, the LED tube comprises, at both ends of the LED tube, two contact pins between which a resistive, inductive and/or capacitive measuring component is connected to form a current path between the contact pins. The safety unit is arranged to detect a low voltage across the measuring component at both ends of the LED tube, the low voltage resulting from a current passing through the measuring component and being generated in the ballast-starter type fluorescent tube lighting fixture by a high-resistance component connected in place of or in parallel with a starter.

According to some embodiments, the high-resistance component is a resistor, a capacitor, an inductance or a combination thereof.

According to an embodiment, the measuring components and the high-resistance component of the LED tube are dimensioned such that the current flowing therein is very substantially lower than a heating current of a fluorescent tube would be.

According to an embodiment, the LED tube comprises user-operable means for connecting or disconnecting the measuring components between the contact pins, according to the lighting fixture.

According to an embodiment, the switching means are arranged to break the current path bipolarly.

According to an embodiment, the detected voltages, heating voltages or low voltages are connected directly to be control voltages of the switching means, e.g. control voltages of a relay or relays.

According to an embodiment, the LED tube comprises means for keeping the switching means closed after the LED tube has ignited even if one or more of the detected voltages becomes lower or non-existent but the main voltage remains.

In an embodiment, a cold cathode type fluorescent tube whose both ends are provided with only one contact pin is replaced, in which case the safety unit is arranged to detect the voltage of the ends of the LED tube.

Another aspect of the invention is a lighting fixture arrangement, comprising a lighting fixture which is meant for a fluorescent tube and in which a LED tube according to an embodiment of the invention is installed.

According to an embodiment, the lighting fixture arrangement includes a ballast-starter type device wherein in place of or in parallel with the starter, a high-resistance component is connected in order to generate a low current for the measuring components of the LED tube.

In a lighting fixture arrangement according to an embodiment, the high-resistance component is a resistor, a capacitor, an inductance or a combination thereof.

By means of the embodiments of the invention, a situation is shown wherein only one end of the LED tube is connected to an energized lighting fixture and a person installing the LED tube is at the risk of receiving an electrical shock through the LED tube from an uninstalled end thereof.

BRIEF DESCRIPTION OF THE FIGURES

The invention is now described in closer detail in connection with exemplary embodiments and with reference to the accompanying drawings, in which.

DESCRIPTION OF EXEMPLARY EMBODIMENTS OF THE INVENTION

The field of application of the invention comprises all lamps, particularly tube lamps, having one or more LEDs as a light source and enabling a fluorescent tube lighting fixture or the like to be replaced.

Figure 3A:
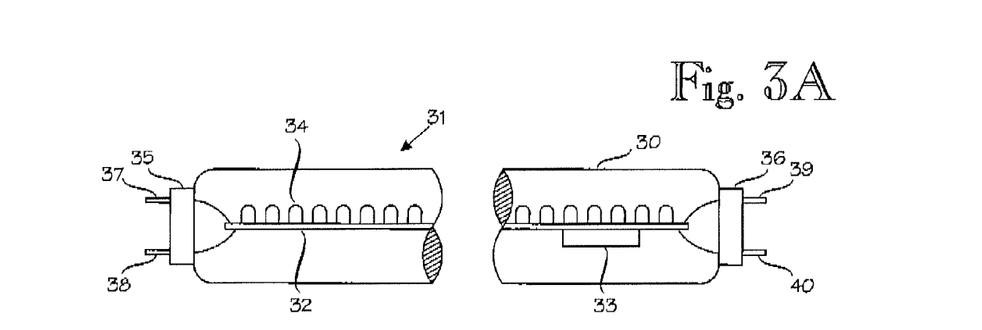
FIG. 3A shows a simplified example of a mechanical structure of a LED tube.

FIG. 3A illustrates a simplified example of a possible structure of a LED tube. The lamp 31 consists of a straight (or bent) tube 30 made from a suitable translucent material, such as glass or plastic, or possibly a fluorescent material. The tube 30 does not have to be airtight. On the contrary, it may be provided with openings, holes and/or gaps for providing air circulation and cooling.

Figure 3B:
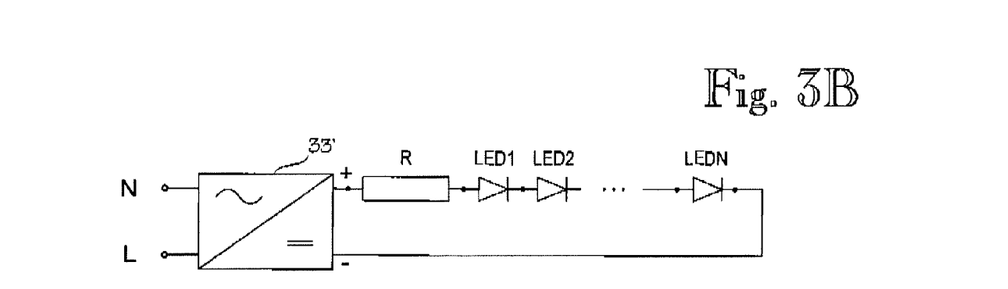
FIG. 3B is a simplified circuit diagram showing an example of a LED circuit of the LED tube of FIG. 3A and current supply thereof.

Inside the tube 30 there is provided a printed circuit board 32 or a corresponding structure wherein LED (Light Emitting Diode) components 34 and electronic current supply components 33 necessitated thereby are installed. The purpose of these components 33 is to convert the alternating voltage (e.g. 230 VAC) of the mains supply network into direct voltage (dc) and regulate the dc current required by the LEDs 34. FIG. 3B shows an example of a possible LED circuit of the LED tube of FIG. 3A and the current supply thereof. In FIG. 3B, the alternating voltage (L) of the supply network and neutral (N) are connected to a rectifier circuit 33', which generates a dc voltage. To the dc voltage, a LED chain having N LEDs in series, where N=1, 2 . . . , is connected via a series resistor R limiting the current. The series resistor R shown in FIG. 3B may be replaced e.g. by an electronic (preferably low-loss) switched mode solution.

Both ends of the tube 30 are closed with a cap 35 or 36 provided with two symmetrically placed contact pins 37 and 38 or 39 and 40. Current supply to the current supply components 33 on the circuit board 32 is carried out via these contact pins 37 and 38, 39 and 40. It is to be noted that the internal structure and electrical implementation of the LED tube are irrelevant to the invention but the safety solution according to embodiments of the invention may be applied in connection with implementations of various types. The mechanical dimensions, at least the length, and the number, location and dimensions of contact pins are preferably the same as those of a fluorescent tube to be replaced, so that it is possible to directly replace the fluorescent tube by a LED tube in an existing fluorescent tube lighting fixture. The dimensions of the LED tube 31 may be compatible e.g. with a T8 tube lamp, whose diameter is about 26 mm and length e.g. 60 or 120 cm. According to an embodiment of the invention, the LED tube is meant to replace a fluorescent tube whose both ends are provided with only one contact pin (single pin tube). Such a tube may be e.g. a cold cathode fluorescent tube having no electrode preheating.

As explained above, if e.g. the LED tube 31 shown in FIG. 3A is installed e.g. in the lighting fixture 20 of FIG. 2, the contact pins 39 and 40 of the LED tube 31 may be inserted into the contact socket 23 of the tube holder 22, which carries a mains voltage. On the other hand, the contact pins 37 and 38 of an opposite end of the LED tube 31 may still be outside the lighting fixture 20 and able to become into contact with an installer. A dangerous voltage may pass from the contact pins 39 and 40 via the structures inside the tube 35, such as the circuit board 32, the LEDs 34 and/or the current supply components 33, to the contact pins 37 and 38.

Figure 4:
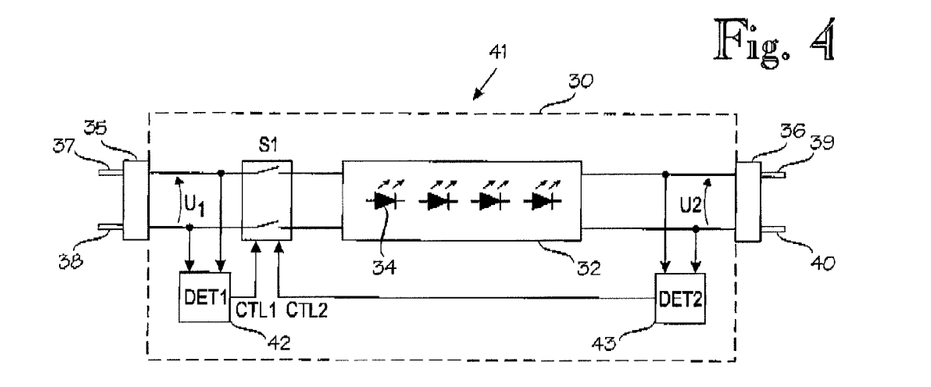
FIG. 4 schematically shows a LED tube according to an exemplary embodiment of the invention.

FIG. 4 schematically shows a LED tube 41 according to an exemplary embodiment of the invention. The mechanical and electrical structures of the LED tube 41 may be similar to those of the LED tube 31 of FIG. 3, for instance, except that the LED tube 41 is further provided with a safety circuit according to an embodiment of the invention in order to remove the risk of an electric shock posed to the installer. Preferably, the components of the safety circuit may be placed on the same printed circuit board 32 or a corresponding structure as where the LEDs 34 and other current supply components 33 are placed.

As explained above in connection with FIG. 1C, the electronic ballast 12 feeds the heating voltage of the electrodes by two conductors directly to both ends of the fluorescent tube 1, more precisely to the contact pins 7, 8, 9, and 10 therein. The operating voltage of the fluorescent tube 1 is generated between these heating voltages, in which case the heating voltages are in a different potential. If the lighting fixture 20 of FIG. 2 contains such an electronic ballast (in which case it contains no starter 11), these heating voltages are also available at the contact sockets 23 of the tube holders 21 and 22.

In some embodiments of the invention, these directly fed, low heating voltages are utilized as detection voltages of a safety circuit. In the example of FIG. 4, voltage detectors (DET1) 42 and (DET2) 43 are arranged inside the LED tube 41. The voltage detector 42 is connected to detect (measure) a heating voltage U1 between the contact pins 37 and 38 provided at a first end of the LED tube 41. The voltage detector 42 activates a control signal CTL1 when the heating voltage U1 is being detected. Similarly, the voltage detector 43 is connected to measure a heating voltage U2 between the contact pins 39 and 40 provided at a second end of the LED tube 41. The voltage detector 43 activates a control signal CTL2 when the heating voltage U2 is being detected. Furthermore, at least one circuit-breaking switch S1 is further provided in connection with the current supply circuit of the LED tube 41 such that the circuit-breaking switch S1, controlled by the control signals CTL1 and CTL2, opens (breaks) or closes (connects) the current circuit of the LED tube and thereby prevents a dangerous voltage from passing through the LED tube from its one end to the other end thereof, or allows this. The circuit-breaking switch S1 is open when the LED tube 41 has not been installed in the lighting fixture, in other words when neither of the voltage detectors 42 and 43 detects a heating voltage U1 and U2, respectively. The circuit-breaking switch S1 is also open when only one end of the LED tube 41 is installed in the contact socket of the lighting fixture, in other words when only one of the voltage detectors 42 and 43 detects the heating voltage U1 or U2, respectively. The circuit-breaking switch S1 closes only if both ends of the LED tube 41 are installed correctly in the tube holders of the lighting fixture and both voltage detectors 42 and 43 detect the heating voltage U1 or U2, respectively, coming from the lighting fixture. This enables a situation to be prevented wherein only one end of the LED tube 41 is connected to the energized parts of the lighting fixture and a person installing the LED tube may receive an electric shock through the LED tube.

Conventional ballast-starter circuits contain no separate heating voltages but the preheating of a fluorescent tube is carried out by a temporary current pulse from a ballast-starter circuit, as was explained in connection with FIG. 1B. In a fluorescent tube lighting fixture provided with such a ballast-starter circuit, no separate heating voltages are thus available for the contact pins 37, 38, 39, and 40 of both ends of the LED tube 41, but to the contact pins 37, 38, 39, and 40 of both ends, the supply voltage of the lighting fixture comes through the ballast 12. In such a lighting fixture, the detection circuits 42 and 43 of the LED tube 41 of the type shown in FIG. 4 should detect (measure) high-ohmically the mains voltage or another supply voltage at the contact pins of different ends of the LED tube. This, again, results in a possible risk of an electric shock via the detection circuit when one end of the LED tube 41 is connected to the contact socket 23 of the lighting fixture but the other end is uninstalled. This is the case irrespective of the fact that in the LED tube according to the embodiment of FIG.

4, the circuit-breaking switch S1 of the safety circuit is opened and no supply voltage is fed to the circuit board 32 therethrough.

Figure 5A:
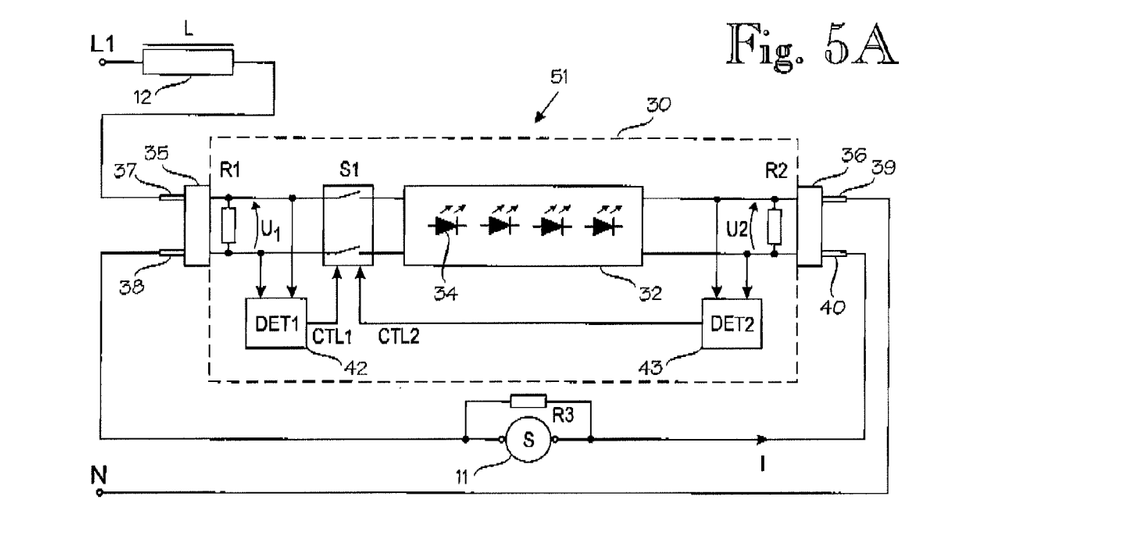
FIG. 5A schematically shows a LED tube and circuit arrangement according to another exemplary embodiment of the invention when installed in a fluorescent tube lighting fixture provided with a ballast-starter combination.

FIG. 5A schematically shows a LED tube 51 and circuit arrangement according to another exemplary embodiment of the invention when installed in a fluorescent tube lighting fixture provided with a ballast-starter combination, e.g. in the lighting fixture 20 in FIG. 2. The mechanical and electrical structures of the LED tube 51 may be similar to those of e.g. the LED tube 31 of FIG. 3, except that the LED tube 51 is further provided with a safety circuit according to an embodiment of the invention in order to remove the risk of an electric shock posed to the installer. Preferably, the components of the safety circuit may be placed on the same printed circuit board 32 or a corresponding structure as where the LEDs 34 and other current supply components 33 are placed. It is to be noted that FIG. 5A shows the contact pins (37, 38, 39, and 40) and the related conductors of the lighting fixture schematically. In practice, the conductors are connected to the contact pins of the LED tube via the contacts 23 according to FIG. 2 that are provided in the tube holders 21 and 22.

Figure 5B:
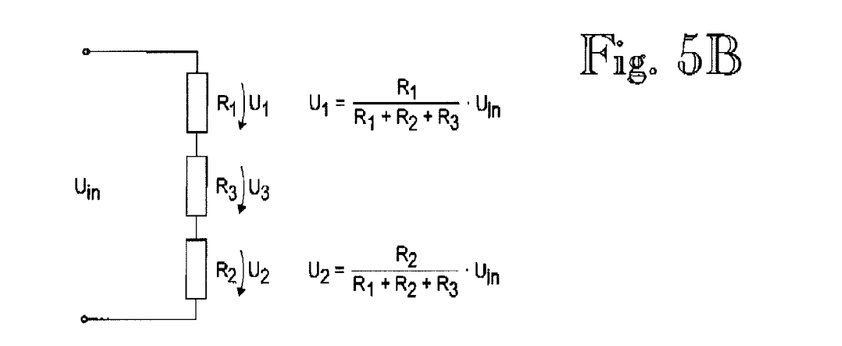
FIG. 5B shows an example of dimensioning of resistors R1, R2, and R3 of FIG. 5A.

The LED tube 51 of FIG. 5A may be substantially similar to the LED tube 41 of another exemplary embodiment, except that in the LED tube 51, a component R1 which replaces a heating filament of an electrode of a fluorescent tube and through which current I is allowed to pass is connected between the contact pins 37 and 38. Similarly, at the other end of the LED tube 51, a component R2 which replaces a heating filament of an electrode of a fluorescent tube and through which current I is allowed to pass is connected between the contact pins 39 and 40. The components R1 and R are e.g. resistors, capacitors, inductances or other corresponding components or combinations thereof. In the circuit arrangement, the starter of the lighting fixture 20 has been removed and replaced by a component R3 having a high resistance, in which case a low current I caused by the network voltage passes therethrough. Alternatively, the component R3 may be placed in parallel with the starter, as illustrated in FIG. 5A. The component R3 may be e.g. a resistor, a capacitor, an inductance or another corresponding component or a combination thereof. The component R3 may be implemented by means of a housing and connectors whose physical dimensions correspond with those of the starter 11 in order to enable the component R3 to be inserted into the socket of the starter 11 in the lighting fixture 20. Preferably, the values of these components R1, R2, and R3 are dimensioned to be high-ohmic such that the current I passing therein is very substantially lower than a heating current of a fluorescent tube would be. By means of an example, FIG. 5B illustrates the dimensioning of the components R1, R2, and R3 when they are resistors. The resistors R1, R2, and R3 are connected in series between a supply voltage Uin (as in FIG. 5A between the phase voltage L1 and neutral N). A voltage U1 (also measured in FIG. 5A) is generated across the resistor R1 and a voltage U2 (also measured in FIG. 5A) is generated across the resistor R2. A voltage U3 is generated across the resistor R3. The values of the voltages U1 and U2 may be determined by means of equations of FIG. 5B. The resistances of the resistors R1, R2, and R3 may be selected so that the desired voltages U1 and U2 are obtained at a certain supply voltage Uin. As is obvious to one skilled in the art, the R1, R2, and R3 shown in the equations may be replaced by symbols Z1, Z2, and Z3 when in place of or in addition to resistance, the components include inductance and/or capacitance.

This arrangement enables a situation to be provided wherein between the contacts 37 and 38 as well as 39 and 40, respectively, (across the components R1 and R2, respectively) of both ends of the LED tube 51, a low voltage U1 and U2, respectively, is generated that may be used as a detection voltage. The voltage detectors 42 and 43 detect the voltages U1 and U2 in a manner similar to that used in detecting the heating voltages, and by the control signals CTL1 and CTL2 control the circuit-breaking switch S1 e.g. in a manner similar to that shown in the embodiment of FIG. 4. This enables the LED tube 41 to be kept completely open (non-conductive) until the voltage detectors 42 and 43 have verified from the voltages U1 and U2 that the tube 41 has been installed reliably in its tube holders 21 and 22 in the lighting fixture 20.

The LED tube 51, which includes the components R1 and R2, is suitable for use also in connection with an electronic ballast, which generates directly the heating voltages. The high-resistance component R1 or R2 causes no significant waste current from the low heating voltage. In some embodiments of the invention, the components R1 and R2 are both in series with at least one switch enabling the components R1 and R2 to be connected and disconnected between the contact pins, in which case the LED tube, according to the installation, may be placed to conform with the tube 51 or the tube 41. The user may choose the positions of the switches by actuators provided in the caps 35 and 36, for instance.

In yet another embodiments of the invention, the LED tube is meant to replace a fluorescent tube whose both ends are provided with only one contact pin (single pin tube). This may be e.g. a cold cathode fluorescent tube having no electrode preheating. For example, a single pin version of the LED tube of FIG. 3A could only be provided with contact pins 37 and 38. The safety unit according to the invention may also be applied to such a single pin LED tube. In such a case, the contact pins 38 and 40 and the corresponding connections may be omitted from the LED tube of FIG. 4, for instance. The voltage detectors 42 and 43 may monitor the voltages of the contact pins 37 and 39 and close the circuit-breaking switch S1 only if both of them detect a voltage.

The at least one circuit-breaking switch S1 mentioned in all embodiments of the invention may be implemented by any switch structure or switch component capable of breaking (disconnecting) a supply-voltage circuit. Preferably, the circuit-breaking takes place bipolarly, as illustrated in the examples of FIGS. 4 and 5. Examples of suitable circuit-breaking switches include electromechanical switches, such as relays, and semiconductor switches, such as transistors. In the examples of FIGS. 4 and 5, the circuit-breaking switch S1 is connected between the contact pins 37, 38 and the rest of the LED circuitry 32 provided on the circuit board 32, in which case it naturally efficiently prevents a dangerous voltage from passing from one end of the LED tube 41 or 51 to the other end thereof. However, alternatively the circuit-breaking switch S1 may be located at any point of the LED circuitry, as long as it breaks the current path in a way which prevents a dangerous voltage from passing from one end of the LED tube 41 or 51 to the other end thereof. In an embodiment of the invention, both ends of the LED tube 41 or 51 are provided with a circuit-breaking switch S1 of their own, which may be controlled by both voltage detectors 42 and 43 or by a voltage detector detecting the heating voltage U1 or U2 of the end in question only. However, increasing the number of circuit-breaking switches increases costs, so it is advantageous to minimize the number of switches.

The voltage detector 42 or 43 may be implemented by any circuit solution which, when a sufficient heating voltage U1 or U2, respectively, occurs, generates a control signal CTL1 or CTL2, respectively, e.g. a control voltage. The voltage detector 42 or 43 may be e.g. a relay or a voltage comparator which derives also its operating voltage from the heating voltage U1 or U2. It may thus also be a part of the switch S1.

Figure 6:
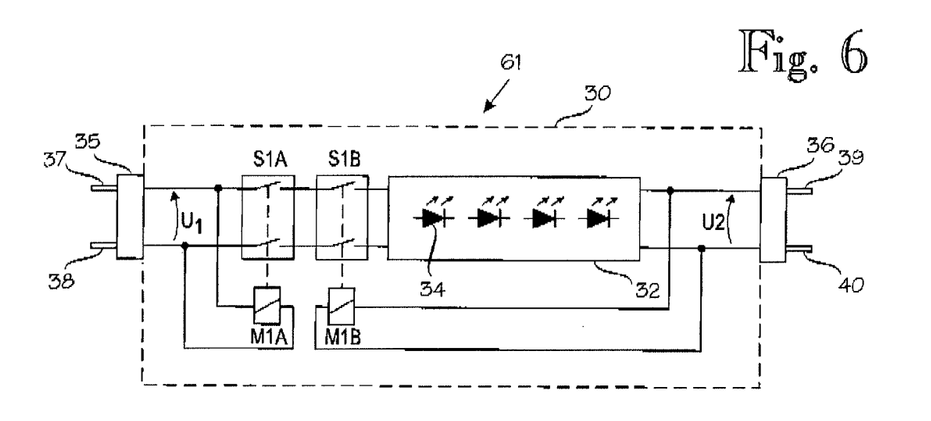
FIG. 6 schematically shows a LED tube according to another exemplary embodiment of the invention, wherein a circuit-breaking switch is implemented by two relays that are directly controlled by heating voltages.

FIG. 6 schematically shows a LED tube 61 according to another exemplary embodiment of the invention, wherein the circuit-breaking switch S1 according to FIGS. 4 and 5A is formed by two successively connected relays S1A and S1B that derive their operating voltage from the heating circuits of different ends of the LED tube 61. In other words, the heating voltage U1 between the contact pins 37 and 38 is connected in parallel with a control coil M1A of the relay S1A and, correspondingly, the heating voltage U2 between the contact pins 39 and 40 is connected in parallel with a control coil M1B of the relay S1B. In such a case, the control coils M1A and M1B of the relays directly form the voltage detectors 42 and 43 according to FIGS. 4 and 5A. When there is a heating voltage U1 between the contact pins 37 and 38, the control coil M1A pulls the contacts of the relay S1A from an open position in to a closed position. Similarly, when there is a heating voltage U2 between the contact pins 39 and 40, the control coil M1B pulls the contacts of the relay S1B from the open position in to the closed position. Both relays S1A and S1B close (the current path is connected) only if both ends of the LED tube 61 have been installed correctly in the tube holders of the lamp and both control coils M1A and M1B receive the heating voltage U1 and U2, respectively, from the lighting fixture. This enables a situation to be prevented wherein only one end of the LED tube 61 is connected to the energized parts of the lighting fixture and the person installing the LED tube may receive an electric shock through the LED tube. This embodiment is particularly suitable for electronic ballasts with separate heating voltage feeds. It is to be noted that instead of two relays S1A and S1B, also one relay having a compound coil for control may be used, in which case it takes both heating voltage feeds to close the relay. More generally, this embodiment may be applied by using, instead of a relay or relays, any circuit-breaking switch, e.g. a semiconductor relay, for which the detected voltages, heating voltages or low voltages are connected directly as control voltages. Direct connecting may also include the use of a driver circuit or circuits of a switch.

Figure 7:
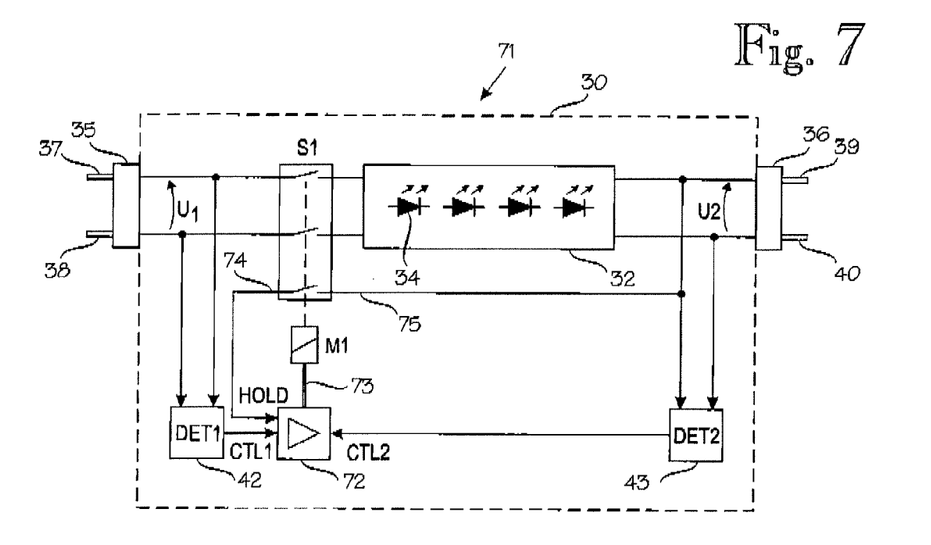
FIG. 7 schematically shows a LED illuminating tube according to yet another exemplary embodiment of the invention, wherein a circuit-breaking switch is kept closed after ignition of the LED tube even if heating voltages become lower or non-existent.

FIG. 7 schematically shows a LED tube 71 according to yet another exemplary embodiment of the invention, wherein the circuit-breaking switch S1 according to FIGS. 4 and 5A is a relay having a control coil M1 and a control amplifier 72. The voltage detectors 42 and 43 detect the voltages U1 and U2, respectively, received at the contact pins 37, 38, 39, and 40 and, by means of the amplifier 72, control the control coil M1 of the switch S1. When the pins of both ends of the tube 71 carry the heating voltages U1 and U2, the voltage detectors generate control signals CTL1 and CTL2 to be fed as inputs to the amplifier 72. Upon receiving both control signals CTL1 and CTL2, the amplifier 72 generates at its control output a voltage or current, as a consequence of which the control coil M1 pulls the contacts of the relay S1 from the open position to the closed position, whereby the current path closes and the LED light unit is lit up. When the switch S1 is closed, the amplifier 72 also receives an indication HOLD of the state of the switch S1, in the form of voltage (tube voltage, arc voltage) received at the different ends of the tube. If now the heating voltage U1 or U2 received at the contact pins 37, 38, 39, and 40 becomes lower or non-existent, the amplifier 72 continues to keep the switch S1 closed, if the hold control HOLD, such as tube voltage, is still supplied to the amplifier via the switch S1. If the tube voltage becomes non-existent at the contact pins 37 and 39, e.g. upon detaching the tube 71 from the lighting fixture or when the lighting fixture is turned off, also the hold control HOLD disappears and the amplifier 72 controls the switch S1 to open. In such a case, the state of the LED tube 71 returns to its original state. Reclosing the switch S1 again requires heating voltages at both ends of the tube 71. This exemplary embodiment is particularly suitable for electronic ballasts provided with an advanced heating circuit, such as preheating, and possibly lowering or disconnection of heating voltages after an ignition process. In this exemplary embodiment, it is ensured that even if the operation of the electronic ballast is such that the heating voltage is disconnected after the tube has ignited, however, the operation continues until the actual supply voltage is connected to the tube 71. It is to be noted that the holding circuit or "holding memory" of the relay S1 may also be implemented in a manner other than via the contacts of the relay S1. More generally this embodiment may be applied by using, instead of a relay, any circuit-breaking switch provided with a holding circuit or "holding memory" for keeping the circuit-breaking switch closed after the LED tube has lit up, even if one or more of the detected voltages U1 and U2 become lower or non-existent but the main voltage (e.g. mains voltage) of the LED tube remains.

It is apparent to one skilled in the art that as technology advances, the basic idea of the invention may be implemented in many different ways. The invention and its embodiments are thus not restricted to the above-described examples but may vary within the scope of the claims.

The invention claimed is:

1. A LED tube, comprising a substantially fluorescent-tube-shaped and fluorescent-tube-sized translucent or fluorescent tube having at least one LED component and a current control unit installed therein, both ends of the LED tube being provided with two contact pins for connecting the LED tube mechanically and electrically to tube holders of a fluorescent tube lighting fixture, at both ends of the LED tube, a resistive, inductive and/or capacitive measuring component is connected between these two contact pins to form a current path between the contact pins, wherein the LED tube includes a safety unit arranged to prevent a voltage from passing through the LED tube from its one end to the other end thereof until at both ends of the LED tube, a voltage fed from the corresponding tube holder of the lighting fixture to said two contact pins has been detected separately, the safety unit being arranged to detect a low voltage across the measuring component at both ends of the LED tube, the low voltage resulting from a current passing through the measuring component and being generated in the ballast-starter circuit in the fluorescent tube lighting fixture by a high-resistance component connected in place of or in parallel with a starter.

2. The LED tube as claimed in claim 1, wherein the safety unit comprises switching means on a current path between the contact pins provided at different ends of the LED tube, the switching means being arranged to be open and break the current path when no voltage has been detected from said two contact pins of at least one of the ends of the LED tube, and arranged to be closed and connect the current path only when a voltage has been detected from said two contact pins of both ends of the LED tube.

3. The LED tube as claimed in claim 1, wherein the safety unit comprises switching means in series on a current path at least between said two contact pins of one end of the LED tube and the current control unit, the switching means being arranged to be open and break the current path when no voltage has been detected from said two contact pins of at least one of the ends of the LED tube, and arranged to be closed and connect the current path only when a voltage has been detected from said two contact pins of both ends of the LED tube.

4. The LED tube as claimed in claim 1, wherein the safety unit is arranged to detect a voltage between the contact pins of the two contact pins at both ends of the LED tube.

5. The LED tube as claimed in claim 1, wherein the safety unit is arranged to detect a heating voltage received from the tube holder of the fluorescent tube lighting fixture at the contact pins at both ends of the LED tube.

6. The LED tube as claimed in claim 1, wherein the high-resistance component is a resistor, a capacitor, an inductance or a combination thereof.

7. The LED tube as claimed in claim 1, wherein the measuring components of the LED tube and the high-resistance component are dimensioned such that the current flowing therein is very substantially lower than a heating current of a fluorescent tube would be.

8. The LED tube as claimed in claim 1, wherein the LED tube comprises user-operable means for selectively connecting the measuring components between the contact pins, according to the type of the lighting fixture.

9. The LED tube as claimed in claim 1, wherein the switching means are arranged to break the current path bipolarly.

10. The LED tube as claimed in claim 1, wherein the detected voltages, heating voltages or low voltages are connected directly to be control voltages of the switching means.

11. The LED tube as claimed in claim 1, wherein the LED tube comprises means for keeping the switching means closed after the LED tube has ignited even if at least one of the detected voltages become lower or non-existent but the main voltage remains.

12. A lighting fixture arrangement, comprising a lamp which is de-signed for a fluorescent tube and in which a LED tube is installed, the LED tube comprising a substantially fluorescent-tube-shaped and fluorescent-tube-sized translucent or fluorescent tube having at least one LED component and a current control unit installed therein, both ends of the LED tube being provided with two contact pins for connecting the LED tube mechanically and electrically to tube holders of a fluorescent tube lighting fixture, at both ends of the LED tube, a resistive, inductive and/or capacitive measuring component is connected between these two contact pins to form a current path between the contact pins, wherein the LED tube includes a safety unit arranged to prevent a voltage from passing through the LED tube from its one end to the other end thereof until at both ends of the LED tube, a voltage fed from the corresponding tube holder of the lighting fixture to said two contact pins has been detected separately, the safety unit being arranged to detect a low voltage across the measuring component at both ends of the LED tube, the low voltage resulting from a current passing through the measuring component and being generated in the ballast-starter circuit in the fluorescent tube lighting fixture by a high-resistance component connected in place of or in parallel with a starter.

13. The lighting fixture arrangement as claimed in claim 12, comprising a ballast-starter assembly, wherein a high-resistance component is connected in place of or in parallel with a starter in order to generate a low current for measuring components of the LED tube.

14. The lighting fixture arrangement as claimed in claim 13, wherein the high-resistance component is a resistor, a capacitor, an inductance or a combination thereof.

* * * * *